United States Patent
Stankovska et al.

(10) Patent No.: US 12,538,112 B2
(45) Date of Patent: Jan. 27, 2026

(54) SYSTEM AND METHOD FOR CROSS AGENCY DEVICE INTEROPERABILITY MANAGEMENT

(71) Applicant: MOTOROLA SOLUTIONS, INC., Chicago, IL (US)

(72) Inventors: Daniela Stankovska, Fort Lauderdale, FL (US); Kiesha Grant, Sunrise, FL (US); Maryam Eneim, Boca Raton, FL (US); Goktug Duman, Miami, FL (US); Sean Regan, Delray Beach, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 326 days.

(21) Appl. No.: 18/066,028

(22) Filed: Dec. 14, 2022

(65) Prior Publication Data

US 2024/0205656 A1  Jun. 20, 2024

(51) Int. Cl.
| | |
|---|---|
| *H04W 4/46* | (2018.01) |
| *H04W 4/90* | (2018.01) |
| *H04W 76/14* | (2018.01) |
| *H04W 76/50* | (2018.01) |
| *H04W 80/12* | (2009.01) |
| *H04W 84/18* | (2009.01) |

(52) U.S. Cl.
CPC ............ *H04W 4/90* (2018.02); *H04W 76/14* (2018.02); *H04W 76/50* (2018.02); *H04W 4/46* (2018.02); *H04W 80/12* (2013.01); *H04W 84/18* (2013.01)

(58) Field of Classification Search
CPC ......... H04W 4/46; H04W 4/90; H04W 76/14; H04W 76/50; H04W 80/12; H04W 84/01
See application file for complete search history.

(56) References Cited

U.S. PATENT DOCUMENTS

| | | | |
|---|---|---|---|
| 8,996,053 B2 | 3/2015 | Wiatrowski | |
| 9,344,872 B2 | 5/2016 | Pandey et al. | |
| 9,646,439 B2 | 5/2017 | Ricci | |
| 9,936,360 B1* | 4/2018 | Schuler | H04W 4/38 |
| 10,777,074 B1* | 9/2020 | Tan | H04W 4/90 |
| 2008/0207241 A1* | 8/2008 | Namm | H04W 8/186 |
| | | | 455/518 |
| 2016/0088463 A1* | 3/2016 | Stanke | H04M 3/5116 |
| | | | 455/404.1 |
| 2018/0314861 A1* | 11/2018 | Guzik | G06F 16/381 |
| 2019/0197369 A1* | 6/2019 | Law | G06N 3/082 |
| 2019/0349894 A1* | 11/2019 | Pai | H04W 72/02 |
| 2021/0142528 A1* | 5/2021 | Stawiszynski | G06F 16/5866 |
| 2021/0153062 A1* | 5/2021 | Zhang | H04W 72/51 |

(Continued)

*Primary Examiner* — Cindy Trandai
(74) *Attorney, Agent, or Firm* — Barbara R Doutre

(57) ABSTRACT

A communication system and method are provided for establishing cross-agency communications for managing an incident scene. Converged devices are paired to in-vehicle computers of public safety (PS) vehicles, each PS vehicle having a different agency role. Device capabilities are compared to determine communication commonalities amongst the paired devices of vehicles of different agency roles. One or more frequency channels common to the devices associated with the deployed vehicles of different agency roles are determined. Communication is established amongst devices associated with vehicles of different agency roles using the determined common channel.

13 Claims, 5 Drawing Sheets

(56) References Cited

U.S. PATENT DOCUMENTS

| | | | |
|---|---|---|---|
| 2021/0200598 A1* | 7/2021 | Barczyk | G06F 9/5055 |
| 2021/0282121 A1* | 9/2021 | Selvanesan | H04W 4/08 |
| 2022/0132603 A1* | 4/2022 | Adjakple | H04W 4/40 |
| 2022/0141616 A1* | 5/2022 | Myshenin | G06Q 10/06311 |
| | | | 455/456.3 |
| 2024/0098816 A1* | 3/2024 | Yan | H04W 76/14 |

* cited by examiner

SYSTEM AND METHOD FOR CROSS AGENCY DEVICE INTEROPERABILITY MANAGEMENT

FIELD OF THE INVENTION

The present invention relates generally to communication systems and more particularly to managing multiple agency communication systems responding to an incident scene.

BACKGROUND

A public safety incident may sometimes require a response from multiple agencies or different agency types. For example, a large scale incident may require on-scene responders from different police departments, emergency medical responders, firefighters, and/or other public safety responders. Challenges arise when such agencies operate on different communication systems, making coordination of activities difficult.

Accordingly, there is a need for a system and method that facilitates cross-agency communication interoperability.

BRIEF DESCRIPTION OF THE FIGURES

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
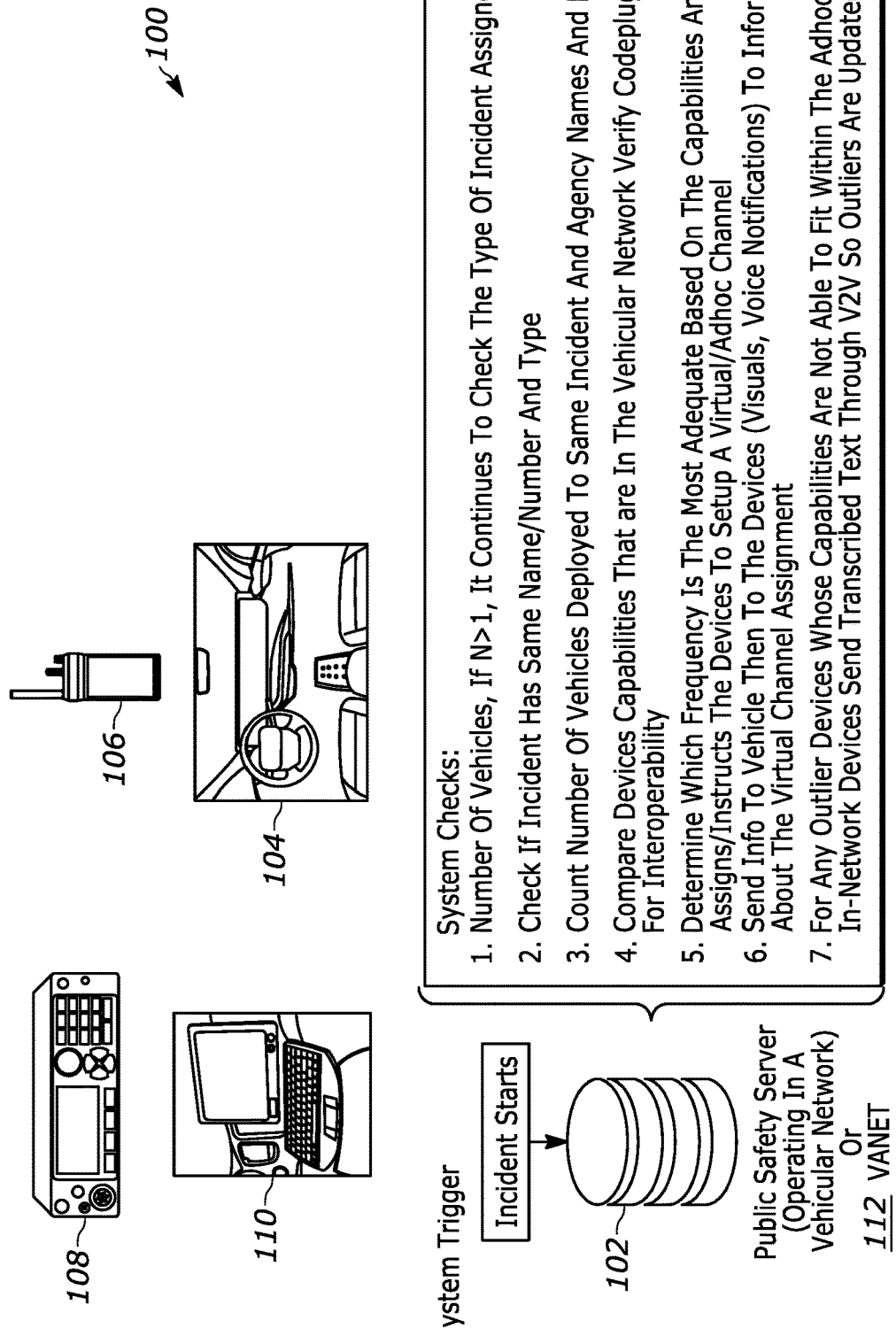
FIG. 1 shows communication elements of a communication system formed and operating in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Briefly, there is provided herein a method and system a communication system and method are provided for establishing cross-agency communications for managing an incident scene. Converged devices are paired to in-vehicle computers of public safety vehicles, each public safety vehicle having a different agency role. Device capabilities are compared to determine communication commonalities amongst the paired devices of vehicles of different agency roles. One or more frequency channels common to the devices associated with the deployed vehicles of different agency roles are determined. Communication is established amongst devices associated with vehicles of different agency roles using the determined common channel.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (Saas), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

FIG. 1 is a diagram of communication components for a communication system 100 formed and operating in accordance with some embodiments. In a first embodiment, communication system 100 includes a public safety (PS) server 102, a public safety (PS) vehicle 104 which includes a plurality of communication devices associated therewith, such as a portable radio 106, a mobile radio 108, and an in-vehicle computer 110. The portable PS radio 106 (and/or mobile radio 110) is preferably a converged portable communication device that may operate over different frequency bands, for example operable over two or more of VHF, UHF, 800 MHz frequency bands and/or in operable both land mobile radio (LMR) and long term evolution (LTE) cellular type networks as well as provide short range communication (BLUETOOTH, WIFI or the like). The public safety server 102 manages incident communications for incidents which involve a plurality of PS vehicles that arrive on scene from different agencies, which are similarly equipped as PS vehicle 104. FIG. 1 is described in terms of one vehicle and its associated communication devices, but it is to be appreciated that the system includes at least two vehicles and their associated communication devices. Additionally or alternatively, the PS vehicles of communication system 100 may be equipped with vehicular ad hoc network capability (VANET) 112. The embodiments to be described herein advantageously facilitate incident management using either the PS server 102 or the VANET 112.

Prior to the occurrence of an incident, the portable radio 106 pairs to the in-vehicle computer 110. Pairing of portable radio 106 to the in-vehicle computer 110 may be accomplished in a variety of ways. For example, pairing may be accomplished between the portable PS radio 106 and the in-vehicle computer 110 through WIFI, BLUETOOTH (BT) or other short range wireless personal area network (PAN) communication. Pairing may also be accomplished by inputting a pairing command to a user interface (UI/UX) of the vehicle to pair to the portable PS radio 106 to the in-vehicle computer 110. Pairing may also be accomplished by hard-wiring the portable PS radio 106 radio to the in-vehicle computer 110.

Each portable radio, such as portable radio 106, that pairs to a PS vehicle includes a code plug, the code plug including an enabled interoperability field. The interoperability field in the codeplug is set by the agency associated with each portable radio during the out of box radio set up. As mentioned previously the portable PS radio 106 is preferably converged device that may operate over different communication bands, for example operable in both land mobile radio (LMR) and long term evolution (LTE) cellular type bands, as well as short range communication. Once paired, the portable radio 106 informs the in-vehicle computer 110 of its communication capabilities (such as VHF, UHF, 7/800 MHZ, LTE, WIFI, BT, communication capabilities, and the like).

For embodiments which use the public safety server 102, once the portable PS radio 106 is paired to the in-vehicle computer 110, then the in-vehicle computer 110 may register with the PS server 102. Registration of the in-vehicle computer 110, prior to an incident occurrence, facilitates the ability of the portable radio 105 as well as other devices within the vehicle, such as mobile radio 108, to be automatically configured for communication with a communication device from a different agency vehicle (similarly paired to its respective in-vehicle computer), in response to a later incident notification, such as a 911 dispatch call.

The pairing of portable radio to an in-vehicle computer and registration of in-vehicle computer to PS server 102, allows for multiple different agencies to be registered with the PS server 102, with each vehicle's communication device capabilities stored within the PS server 102, prior to any incident notification. Once an incident notification including incident type is received and various agency vehicles are dispatched, the agency role and device capabilities for each dispatched vehicle can be compared for commonalities, and the communication commonalities are communicated from the PS server 102 to each in-vehicle computer that was dispatched to the incident. The communication commonalities between different agencies and incident management coordination (which band to communicate on) are displayed and/or audibly communicated at each in-vehicle computer so that cross-agency communication can be established.

Continuing with the PS server 102 embodiment, upon arrival at an incident scene, each vehicle's respective communication devices already have interoperability codeplug field enabled and the user may select, based on incident management coordination information presented by the in-vehicle computer, the channel upon which to communicate for different agencies. For example, portable radio 106 may communicate with another device of a different agency (e.g. paramedic radio, SWAT, or other) at the incident scene based on the displayed information, In embodiments that utilize the public safety server 102, the determination of channel overlap and coordination of incident management communication is thus managed by the PS server 102 and communicated to each in-vehicle computer. The communication system further provides for transcribed text of cross-agency communications to be displayed on in-vehicle computers associated with converged devices that cannot communicate on the common channel (outlier devices).

Moving to the embodiment in which the communication system 100 utilizes a distributed vehicular ad-hoc network, VANET 112, the pairing of portable radio 106 to in-vehicle computer 110 (and other radios to their respective in-vehicle computers) is similar to that previously described. Also similar to the PS server embodiment, the portable radio(s) 106 includes an enabled interoperability codeplug field. However, the use of VANET 112 negates the need for a PS server and negates the need for any registration to a public safety server. The in-vehicle computers, such as in-vehicle computer 110, equipped with VANET capability include sensors which detect other VANET enabled vehicles upon arrival at an incident scene. The in-vehicle computers have their respective communication device/devices communication capabilities information stored therein and are aware of the interoperability codeplug being enabled. VANET 112 enables communication between the in-vehicle computers (V2V communication) at an incident scene to compare device capabilities at the scene. Communication commonalities amongst paired devices of vehicles of different agencies are determined and communication amongst devices associated with different agencies is established on a common channel. As vehicles continue to arrive at the incident scene, the in-vehicle computers may renegotiate the common capabilities over VANET 112. For example, as a first PS vehicle arrives on scene, the in-vehicle computer does not detect any other vehicles in the vehicular network. When a second PS vehicle arrives on scene, the first and second vehicle respective in-vehicle computers, sense that both are on scene and negotiate back a forth for the common device capabilities. Later, if a third vehicle arrives on scene, then the three vehicles renegotiate the common capabilities, etc. The renegotiation is accomplished via the in-vehicle computers communicating over the VANET 112.

Hence, decisions as to which channel is going to be used for communication between different agencies can be accomplished in two ways: first by a determination made by a public safety server 102 which is communicated to each in-vehicle computer dispatched to an incident, and/or secondly, by using a distributed vehicular ad-hoc network 112 (VANET) in which the in-vehicle computers of different agency vehicles negotiate amongst themselves as the vehicles arrive to an incident scene as to device commonalities to determine which communication channel to use.

Both embodiments, allow for different devices within the vehicle to communicate with different agency devices of other vehicles. For example, a communication device, such as the portable PS radio 106 within PS vehicle 104 of a first law enforcement agency to communicate over a first common channel with a device of a second different agency, such as a fire rescue agency or a different law enforcement agency. And, another device, for example mobile radio 108 of the same vehicle 104, of the first agency may communicate over a second common channel with a device of a third different agency, for example an EMT agency or another different law enforcement agency. In other words, there may be more than one common channel assignment per vehicle, so that one device, such as the portable PS radio 106 can communicate with different agency devices and/or different devices within the same vehicle may further communicate with other agency devices. Devices whose capabilities do not overlap with any other devices within the dispatched devices (outlier devices) may receive transcribed text through the vehicle to vehicle network to remain updated.

Figure 2A:
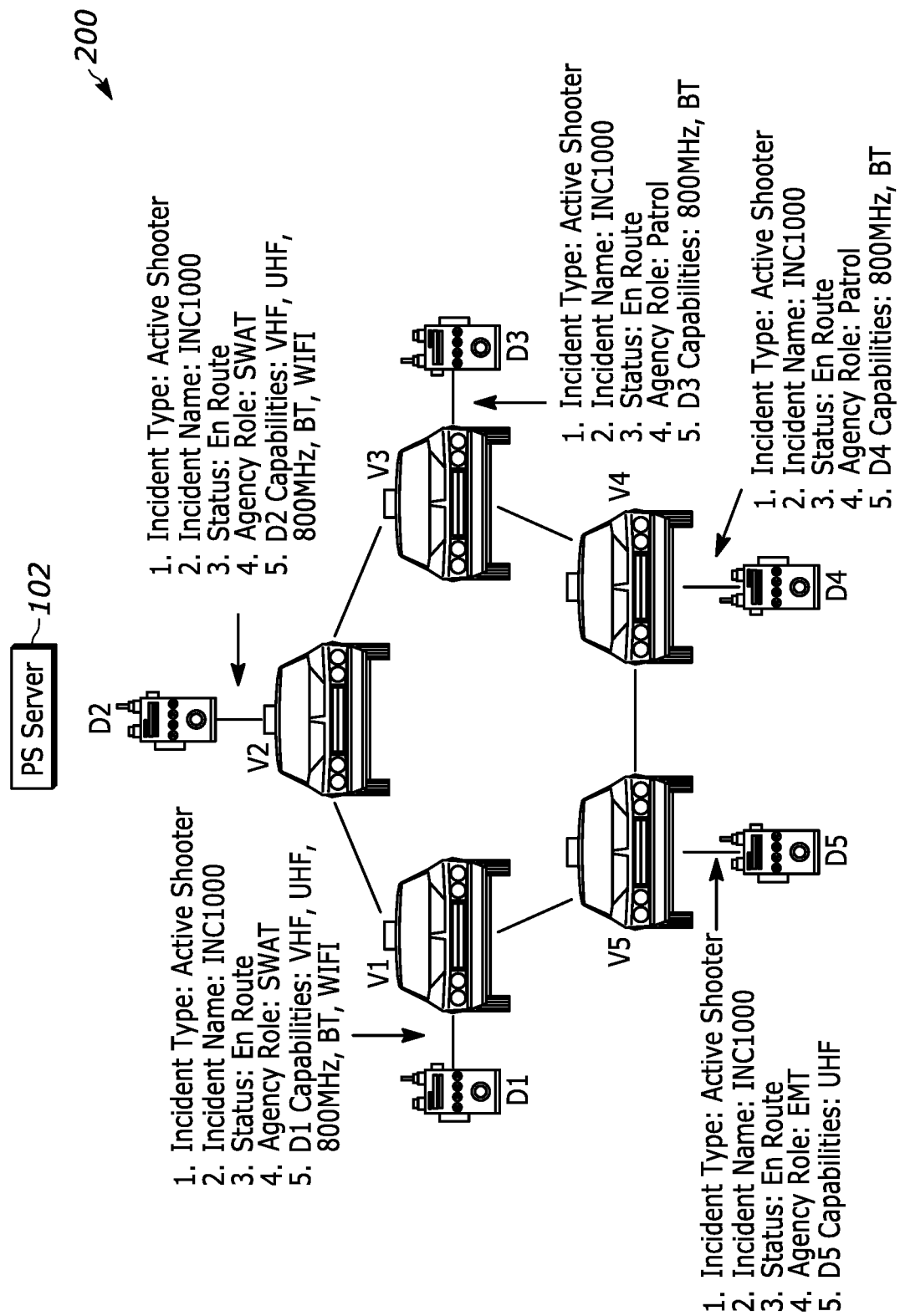
FIG. 2A is a diagram of a communication system formed and in accordance with some embodiments.

For both embodiments, a PS communication device, such as portable radio 106 and/or mobile radio 108, is/are paired to the in-vehicle computer 110 prior to an incident and such devices include an enabled interoperability field. In both embodiments, in response to an incident notification identifying incident type, a determination is made that more than one PS vehicle has been deployed to the incident scene and that at least two of the PS vehicles are from different agencies which are not interoperable using traditional communication modes. Cross agency communication is established based on determined common device capabilities associated with the devices paired to their respective in-vehicle computers. For the PS server embodiment, incident coordination is managed by the PS server 102 and communicated to the in-vehicle computers. For the VANET embodiment, channel coordination is negotiated from in-vehicle computer to in-vehicle FIG. 2A provides an example diagram of a communication system 200 operating in accordance with some embodiments. The PS server 102 manages the communication system 200 in response to an incident notification identifying incident type by determining that more than one PS vehicle (N>1) has been assigned to the incident. An identification name or number may be assigned to the incident, along with incident type. For example, the identification name/number may assign as INC1000 or the like, and the incident type, may be identified as, "active shooter', 'explosion', or the like. The vehicles dispatched to an incident are also identified based on agency role for the dispatched incident. For example, Agency Role for a dispatched vehicle may be 'SWAT', 'Patrol', 'EMT', 'Fire rescue', to name a few.

Communication system 200 includes a plurality of registered vehicles V1, V2, V3, V4, and V5 that have been dispatched to an incident scene in response to an incident notification identifying incident type is received at the PS server 102. Each vehicle, V1, V2, V3, V4, and V5, includes at least one respective communication device D1, D2, D3, D4, D5. Each respective communication device D1, D2, D3, D4, D5 has been previously paired with each respective in-vehicle computer, so that device capability information is stored therein. Each respective communication device D1, D2, D3, D4, D5 has an interoperability field enabled. Each in-vehicle computer has been previously registered to the PS server 102, prior to any incident.

In the example of FIG. 2A, the PS server 102 has assigned an incident name/number of INC1000 and identified the incident type as 'active shooter'. In the example of FIG. 2A, vehicle 1 (V1) has device (D1) having device capabilities of VHF, UHF, 800 MHZ, BT, and WIFI and the agency role is SWAT, vehicle 2 (V2) has the same agency role and device capabilities as V1/D1; vehicle 3 (V3) has device (D3) having device capabilities of 800 MHZ and BT and the agency role of Patrol; vehicle 4 (V4) has device (D4) having device capabilities of 800 MHz and BT; vehicle 5 (V5) has device (D5) having device capabilities of UHF and the agency role is EMT.

In the example of FIG. 2A, upon dispatch, the device capabilities (agency role, frequency bands) for each dispatched vehicle are compared for commonalities at the PS serer 102, and the communication commonalities are communicated from the PS server 102 to each in-vehicle computer that was dispatched to the incident. The communication commonalities between different agencies and incident management coordination (which band to communicate on) are displayed and/or audibly communicated at each in-vehicle computer thereby establishing the channels to use for cross-agency communication.

The determination of device capabilities and comparison to determine communication commonalities may be used to generate a Table and or audible instructions for display or read-out at each in-vehicle computer. The in-vehicle computer may further provide the Table or information from the Table to its associated paired device(s). The Table may include a channel name or alias indicating the common communication channel, for example "move to channel 2 interop" for communication between SWAT (V1, D1) and Patrol (V3, D3), or other similar type instructions and information. Additionally, for devices without communication commonalities, transcribed communications of other communicating devices within the system may be displayed on the in-vehicle computer. For example, communication between SWAT (V2, D2) and Patrol (V3, D3) may be converted to text and sent to the EMT vehicle (V5) for display via the low bandwidth V2V of the in-vehicle computer, which may further be communicated and displayed on associated paired device D5. The following Table provides an example of such information.

TABLE

SWAT (V1, D1) and SWAT (V2, D2) communicate with Patrol (V3, D3) and Patrol (V4, D4) by using channel 2 interop
SWAT (V1, D1) and SWAT (V2, D2) communicate with EMT (V5, D5) by using channel 4 interop
EMT (V5, D5) cannot communicate with Patrol (V3, D3) or Patrol (V4, D4); text messages of transcribed text between Patrol (V3, D3) or Patrol (V4, D4); may be displayed on EMT in-vehicle computer interface and/or displayed on paired device interface (D5)

The above information may be displayed at each in-vehicle computer as the vehicles are deployed to the scene. The user may thus select the channel on their paired device to establish communication with a different agency, thereby achieving cross-agency communication. The information may be displayed in other formats for ease of viewing.

Figure 2B:
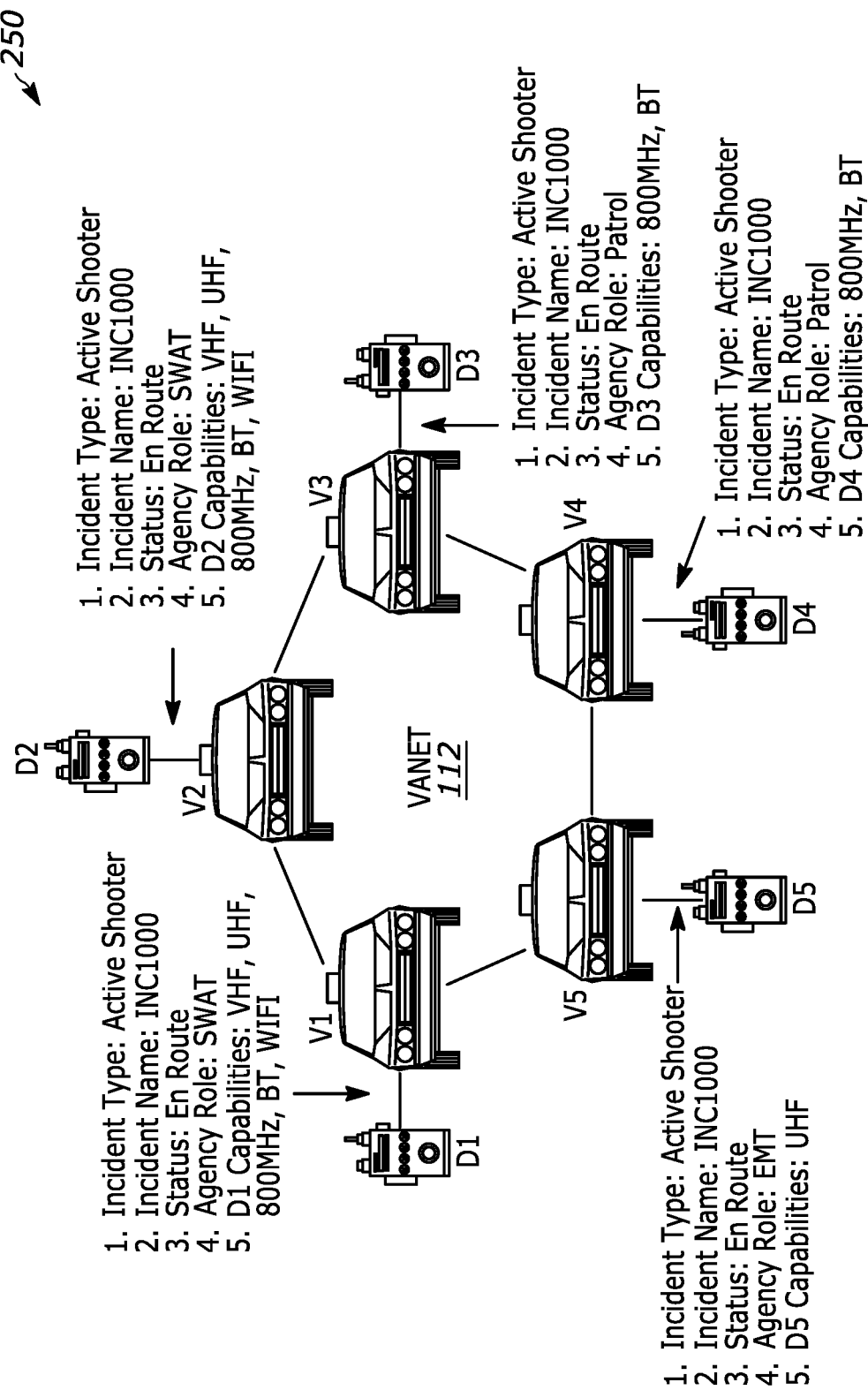
FIG. 2B is a diagram of a communication system formed and in accordance with some embodiments.

FIG. 2B provides another example diagram of a communication system 250 operating in accordance with some embodiments. Communication system 250 utilizes VANET 112 and therefore does not require registration and thus does not include the public safety server 102. Here, the VANET 112 determines that more than one vehicle (N>1) have arrived to an incident and recognizes the type of incident to which the PS vehicles have been assigned. The VANET 112 recognizes identification name or number assigned to the incident, along with incident type. Similar to communication system 200, the identification name/number may assign as INC1000 or the like, and the incident type, may be identified as, "active shooter', 'explosion', or the like. The vehicles at the scene are also identified based on agency role for the dispatched incident. For example, Agency Role for a dispatched vehicle may be 'SWAT', 'Patrol', 'EMT', 'Fire rescue', to name a few.

When using VANET, no server registration is needed and determination of communication commonalities is determined via the in-vehicle computers communicating wirelessly at the scene. The negotiation may result in a similar outcome to the Table shown above for FIG. 2A, however updates to the Table can be made on-location as new vehicles arrive on the scene having VANET capability. Renegotiation based on communication commonalities can be used to establish updated communications which include (or exclude) the new arrival.

An example of VANET renegotiation, a sixth PS vehicle V6/D6 (not shown) having VANET capability may arrive on scene and is sensed by the other vehicles and identified as INC1000, agency role EMT with having UHF. 800 MHZ, BT device capabilities. A renegotiation based on communication commonalities takes place over the in-vehicle computers which may for example display instructions on a Table (similar to that shown previously) and/or audibly provide instructions indicating the renegotiated common channels to establish communication between V6/D6 with one or more of the other devices associated with the incident. An update to the displayed Table may appear on the in-vehicle computers, upon arrival of the new vehicle V6/D6 arriving on scene:

While FIG. 2A and FIG. 2B show a plurality of different PS vehicles associated with devices of three different agency roles, it is to be appreciated that the embodiments are applicable to two or more agency roles which are not traditionally interoperable. The pairing and storing of communication device capability information to the in-vehicle computer 110 is similar for both PS server 102 embodiment and the VANET 112 embodiment. The comparing of device capabilities to determine of communication commonalties as vehicles are deployed to an incident differs between FIG. 2A and FIG. 2B. For the PS server 102 embodiment, the comparing of device capabilities to determine communication commonalities occurs at the PS server 102, and incident management to establish a common channel between diffident agencies is coordinated by the PS server 102 and communicated to the in-vehicle computers deployed to the incident. For the VANET 112 embodiment, the comparing of device capabilities to determine communication commonalities occurs at the in-vehicle computers at the scene, and incident management to establish a common channel between diffident agencies is negotiated by the in-vehicle computers of vehicles at the scene. The PS server embodiment allows the cross agency communication to be established between deployed vehicles prior to arrival the scene, while the VANET 112 approach provides on-scene flexibility to negotiate (and renegotiated) communication channels between agencies at the scene. It is also possible that a combination of PS server 102 and VANET 112 may be utilized.

Figure 3:
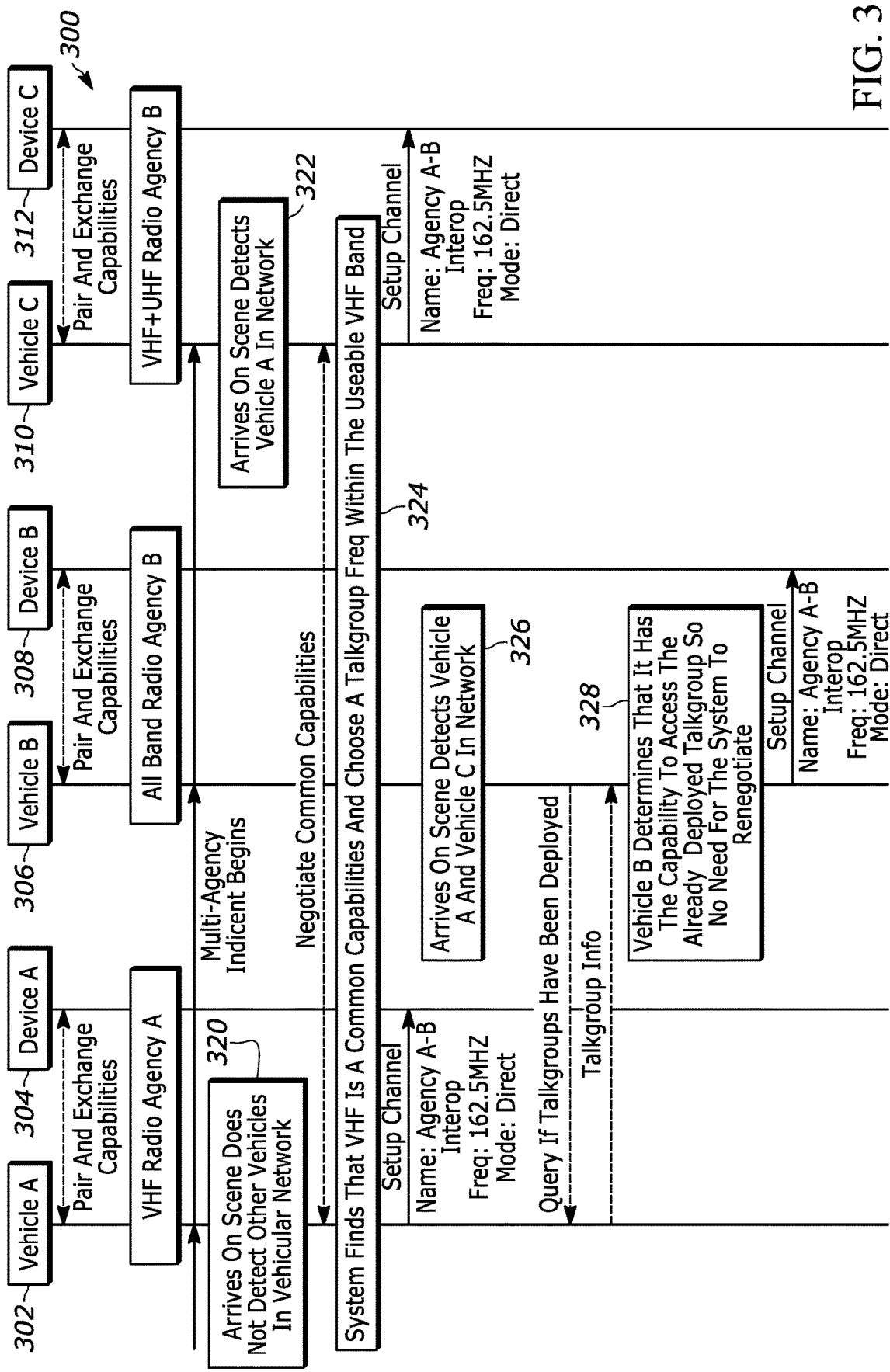
FIG. 3 is a message sequencing diagram for a communication system formed and operating in accordance with some embodiments.

FIG. 3 is a message sequencing diagram for a communication system formed and operating in accordance with the VANET embodiment. In this example, three vehicles each have at least one respective communication device and an in-vehicle computer with VANET capability. Vehicle A 302 and device A 304 pair and exchange capabilities, vehicle B 306 and device B 308 pair and exchange capabilities, and vehicle C 310 and device C 312 pair and exchange capabilities. The exchange of capabilities means the storing of device capabilities to the in-vehicle computer. Each device 304, 308, 312 pairs with its respective in-vehicle computer, using a short range wireless interface, such as BT or WIFI or the like as previously described. In this example, device A 304 is shown as a VHF radio from agency A, device B 308 is shown as an all band radio from agency B, and device C 312 is shown as a VHF and UHF capable radio from agency B.

Vehicle A/device A arrives on scene at 320, and the in-vehicle computer does not initially detect other vehicles in the vehicular network. Vehicle C/device C arrives on scene at 322 and the in-vehicle computer detects that vehicle A is in the vehicular network. Device capability information is shared and communication commonalities are determined at the in-vehicle computers. For example, at 324 the VANET wireless communication across the in-vehicle computers determines that the VHF band is common to both device A of agency A and device B of agency B and forms a talkgroup within a useable VHF channel. A talkgroup channel is set up for interoperability between device A/agency A and device C/agency B. For example, a talkgroup name of 'agency A-B interop', may be assigned a frequency 162.5 MHz for direct mode communication (radio-to-radio). This common channel information is communicated to a user via the in-vehicle computer display of Vehicle A and Vehicle C. The channel information may be communicated to a user by a channel name/alias that was negotiated based common capabilities. The end user does not need to be aware of the frequency, just information that the device has a set up, such as 'interop channel named X', for cross agency communication.

Vehicle B/device B arrives on scene at 326, and Vehicle B's associated in-vehicle computer detects that vehicle A/device A and vehicle C/Device C are operating within VANET 112. Vehicle B's in-vehicle computer device sends a query to vehicle A's in-vehicle computer to determine if talkgroups have been deployed, and vehicle A's in-vehicle computer sends the talkgroup information back to vehicle C's in-vehicle computer.

Vehicle B's in-vehicle computer determines at 328 that it has the capability to access the already deployed talkgroup, thereby negating any need for renegotiation of talkgroups. Vehicle B's in-vehicle computer sets up the same communication channel so that device B can now join the talkgroup.

A notification may be displayed on user interface of the vehicle, advising the user of the common channel set up for each agency. Three devices, one being from a different agency, and are now able to advantageously communicate in a single talkgroup.

Figure 4:
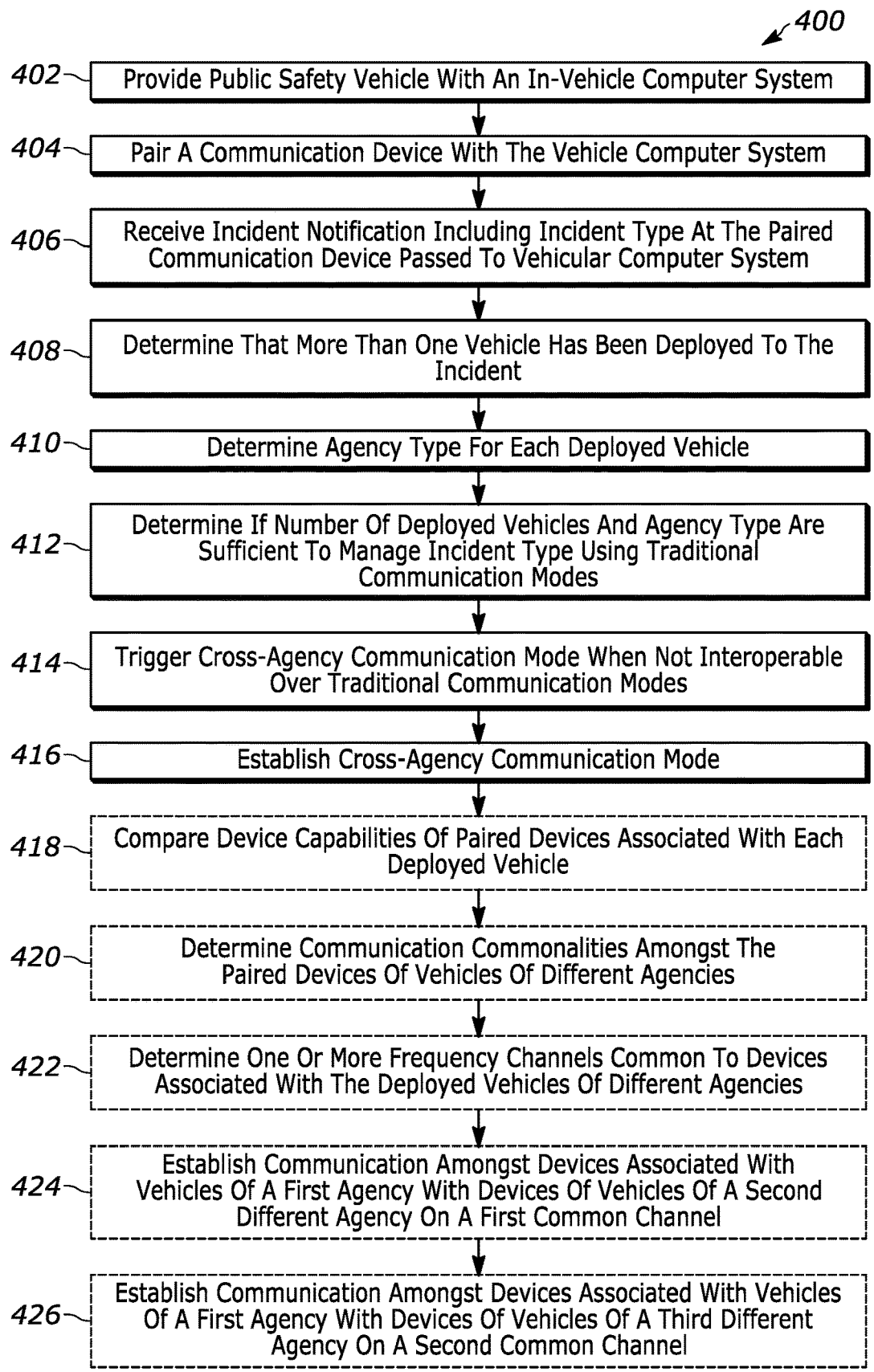
FIG. 4 is a flowchart for a method of establishing cross-agency communications for managing an incident in accordance with some embodiments.

FIG. 4 is a flowchart for a method 400 of establishing cross-agency communications for managing an incident in accordance with some embodiments. Method 400 applies to both the PS server embodiment and/or the VANET embodiment of the communication system of FIG. 1. The method begins by providing a public safety vehicle, such as PS vehicle 104 of FIG. 1, with an in-vehicle computer. At 404, the method continues by pairing a communication device, such as portable PS radio 106, with the vehicular computer of the vehicle. The method continues at 406 with receiving an incident notification including incident type at the paired communication device which is passed to the vehicular computer.

The method continues with determining, by the vehicle computer, at 408 that more than one vehicle has been deployed to the incident. The method continues to 410 with determining agency role associated with each deployed vehicle, and then determining, by the in-vehicle computer, at 412 if the number of deployed vehicles and agency role associated with each deployed vehicle are sufficient to manage the incident type using traditional communication modes. A cross-agency communication mode is triggered at 414 when the number of deployed vehicles and agency role associated with each deployed vehicle are lack sufficient interoperability to manage the incident type using traditional communication modes.

The method continues by establishing the cross-agency communication mode at 416 by: comparing device capabilities of the paired devices associated with each deployed vehicle, including type of device and available frequency channels for those devices at 418. At 420, the method continues with determining communication commonalities (overlap in frequency bands, such as VHF, UHF, all-band, to name a few) amongst the paired devices of vehicles of different agencies. For example, different agencies may include, SWAT, EMT, police, and fire rescue, to name a few.

The method then continues at 422 with determining one or more frequency channels common to the devices associated with the deployed vehicles of different agency roles. This determination allows for establishing communication amongst devices associated with vehicles of different agency roles on a common channel of one or more frequency channels common to the devices associated with the deployed vehicles of different agency roles. For example, communication may be established 424 amongst devices associated with vehicles of a first agency with devices of vehicles of a second different agency on a first common channel, and communication may also further be established at 426 amongst devices associated with vehicles of the first agency with devices of vehicles of a third different agency on a second common channel. Hence, one or more common channels may be used depending on the number of devices in the vehicle and the number of different agencies.

Accordingly, method 400 provides for the establishing cross-agency communications for managing an incident scene. The establishing of the cross-agency communication mode may be managed by the in-vehicle computer of each deployed vehicle and at least one of: a public safety server, and a vehicular adhoc network (VANET), such as were described in conjunction with the previous figures.

As should be appreciated from the detailed description above, the operations and functions used to establish cross-agency communications are sufficiently complex as to require their implementation on a computer system, and cannot be performed, as a practical matter, in the human mind. The devices such as set forth herein are understood as requiring and providing speed and accuracy and complexity management that are not obtainable by human mental steps, in addition to the inherently digital nature of such operations (e.g., a human mind cannot determine and compare device capabilities to determine communication commonalities amongst a plurality of different vehicles from different agencies deployed to an incident, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of establishing cross-agency communications for managing an incident scene, comprising:
   pairing a communication device with an in-vehicle computer of a vehicle, each paired communication device being a converged device;
   receiving an incident notification including incident type;
   determining that more than one vehicle has been deployed to the incident, each having a paired communication device;
   determining agency role associated with each deployed vehicle;
   determining if the number of deployed vehicles and agency role associated with each deployed vehicle are sufficient to manage the incident type using traditional communication modes;
   triggering a cross-agency communication mode when the number of deployed vehicles and agency role associated with each deployed vehicle are insufficient to manage the incident type;
   establishing the cross-agency communication mode by:
      comparing device capabilities of the paired communication devices associated with each deployed vehicle;
      determining communication commonalities within the device capabilities amongst the paired communication devices of vehicles of different agency roles;
      determining one or more frequency channels common to the paired communication devices associated with deployed vehicles of different agency roles; and
      establishing communication amongst paired communication devices associated with vehicles of different agency roles using a common channel of the one or more frequency channels common to the paired communication devices associated with the deployed vehicles of different agency roles.

2. The method of claim 1, wherein establishing further comprises:
   establishing communication amongst paired communication devices associated with vehicles of a first agency with paired devices of vehicles of a second different agency on a first common channel, and
   establishing communication amongst paired communication devices associated with vehicles of the first agency with devices of vehicles of a third different agency on a second common channel.

3. The method of claim 1, further comprising:
   notifying, via a user interface of the in-vehicle computer, a common channel set up for cross agency communication.

4. The method of claim 1, further comprising:
   sending transcribed text of cross-agency communications for display on in-vehicle computers associated with paired communication devices that cannot communicate on the common channel.

5. The method of claim 1, wherein pairing the communication device with the in-vehicle computer comprises one of:
   pairing the communication device to the in-vehicle computer via a personal area network (PAN);
   inputting a pairing command to a user interface of the in-vehicle computer to pair the communication device to the in-vehicle computer; and
   hardwiring a mobile radio to the in-vehicle computer.

6. The method of claim 1, further comprising:
   enabling an interoperability field in a codeplug in each paired communication device.

7. The method of claim 1, wherein the establishing of the cross-agency communication mode by is managed by the in-vehicle computer of each deployed vehicle and at least one of:
   a public safety server; and
   a vehicular adhoc network (VANET).

8. A communication system, comprising:
a plurality of public safety (PS) vehicles associated with different agency roles, each PS vehicle having an in-vehicle computer to which at least one PS communication device is paired, the PS communication device being a converged PS communication device; and
each in-vehicle computer configured to establish cross-agency communication amongst converged PS communication devices associated with vehicles of different agency roles based on a common channel of one or more frequency channels of the converged PS communication devices.

9. The communication system of claim 8, wherein the cross-agency communication establishes communication amongst PS communication devices associated with PS vehicles of a first agency role with PS communication devices of PS vehicles of a second agency role, on a first common channel, and
establishes communication amongst PS communication devices associated with PS vehicles of the first agency role with PS communication devices of PS vehicles of a third different agency role on a second common channel.

10. The communication system of claim 8, wherein transcribed text of cross-agency communications are displayed on in-vehicle computers associated with PS communication devices that cannot communicate on the common channel.

11. The communication system of claim 8, wherein each PS communication device is paired with its respective in-vehicle computer using one of:
pairing the PS communication device to the in-vehicle computer via a personal area network (PAN);
inputting a pairing command to a user interface of the in-vehicle computer to pair the PS communication device to the in-vehicle computer; and
hardwiring a PS mobile radio to the in-vehicle computer.

12. The communication system of claim 8, wherein each PS communication device includes a codeplug with an interoperability field enabled.

13. The communication system of claim 8, wherein the cross-agency communication is managed by the in-vehicle computer of each deployed PS vehicle and at least one of:
a public safety server; and
a vehicular adhoc network (VANET).

\* \* \* \* \*